United States Patent [19]
LaFleur

[11] Patent Number: 5,897,974
[45] Date of Patent: Apr. 27, 1999

[54] SOLID POLYMER ELECTROLYTE

[75] Inventor: Edward Ewart LaFleur, Warminster, Pa.

[73] Assignee: Rohm and Haas Company, Philadelphia, Pa.

[21] Appl. No.: 08/873,406

[22] Filed: Jun. 12, 1997

Related U.S. Application Data

[60] Provisional application No. 60/022,544, Jul. 23, 1996.

[51] Int. Cl.$^6$ ...................................................... H01M 6/18
[52] U.S. Cl. ........................... 429/192; 429/190; 429/191; 252/62.2
[58] Field of Search .................................... 429/190, 192, 429/191; 252/62.2

[56] References Cited

U.S. PATENT DOCUMENTS

| | | | |
|---|---|---|---|
| 4,908,283 | 3/1990 | Takahashi et al. | 429/192 |
| 5,275,750 | 1/1994 | Sato et al. | 252/62.2 |
| 5,356,553 | 10/1994 | Kono et al. | 252/62.2 |
| 5,436,090 | 7/1995 | Kono et al. | 429/191 |
| 5,549,988 | 8/1996 | Reichert et al. | 429/192 |
| 5,665,265 | 9/1997 | Gies et al. | 252/62.2 |

OTHER PUBLICATIONS

Patent Abstracts of Japan, vol. 015, No. 459 (E–1136), Nov. 21, 1991 for JP 03 196407A (UBE IND LTD).
Patent Abstracts of Japan, vol. 015, No. 265 (E–1086), Jul. 5, 1991 for JP 03 088209 A (YUASA BATTERY CO LTD).
Patent Abstracts of Japan, vol. 014, No. 213 (E–0923), May 7, 1990 for JP 02 049357 A (NOK CORP).
Patent Abstracts of Japan, vol. 015, No. 474 (C–0890), Dec. 3, 1991 for JP 03 205416 A (YUASA BATTERY CO LTD).

*Primary Examiner*—Alan Diamond
*Attorney, Agent, or Firm*—Roger Graham; Kevin Gironda; John Lemanowicz

[57] ABSTRACT

A miscible blend of two acrylic polymers, one of which contains a poly(1,2-alkyleneoxy) side chain, with a soluble lithium salt yields a conducting polymer system useful in small rechargeable batteries without the need for volatile polar solvents. By employing one polymer with a glass temperature below 35° C. in conjunction with control of molecular weight of both components, a flexible film may be formed by conventional thermoplastic methods. The conductive salt, preferably $LiN(CF_3SO_2)_2$, may be incorporated during the polymerization which forms the acrylic polymers.

6 Claims, No Drawings

SOLID POLYMER ELECTROLYTE

This application claims the benefit of provisional application Ser. No. 60/022,544 filed Jul. 23, 1996.

The present invention relates to a solid electrolyte having ionic conductivity which can be used for cells, batteries, electrochromic displays, and sensors.

Solid electrolytes are desirable in the construction of electrolytic cells, batteries, electrolytic capacitors, and the like because the problems of leakage from liquid electrolytes is avoided, there is less need for protection against overcharging and subsequent instability of the liquid electrolyte system, fabrication ease is enhanced, and unusual shapes and sizes may be prepared with relative ease. For best results, the solid electrolyte should exhibit good mechanical properties, such as light weight with retention of structure over a range of temperatures. Another desirable property is ease of fabrication, such as by molding, extrusion, or thermoforming. Further, to compete with liquid electrolytes, the conductivity of the solid electrolyte must be equivalent, or the cell will have very low capacity or need to be undesirably large in size.

Currently known "solid" polymer electrolytes are prepared from mixtures of high polymers or low molecular weight organic compounds, non-fugitive solvents and lithium salts. The economically and practically feasible methods to date involve dissolution of the solid polymer and salts in high boiling point polar organic solvents prior to the casting of thin films.

Many attempts have been reported to prepare solid electrolytes free from solvents which have attractive conductive properties at room temperature, along with the other desirable features enumerated herein, but no system has proved fully attractive.

It is known to the art that polymers of ethylene oxide (PEO) have attractive properties as substrates for ionic conductors, but require solvents such as propylene carbonate or ethylene carbonate to function adequately. Several references exist to such polymers with one or both ends capped with a free-radical polymerizable functionality, such as a (meth)acryloyl group; these polymers may be then polymerized into a solidified form which no longer require solvent for conductivity. The drawback to this approach is that crosslinking or formation of a three-dimensional network occurs, which prevents fabrication of the polymers into useful shapes and forms for engineering battery construction.

Typical of the prior art is Takahashi et al., U.S. Pat. No. 4,908,283 which teaches a cured or crosslinked composition comprising a crosslinked polymer of molecular weight 200 to 3000 of a monomethacrylate or monoacrylate ester or a dimethacrylate or diacrylate ester of a low molecular weight (degree of polymerization=1–30) poly(ethylene oxide), and an inorganic ion salt. Takahashi further teaches a solid electrolyte cell which is not cured, but the presence of a water-sensitive plasticizing poly(alkylene) glycol is also required.

Thus the need still exists for a non-plasticized, melt processable, solid and dimensionally stable, conductive electrolyte film. I have discovered a composition which is a polymer alloy or miscible blend of two acrylic polymers, which contains a dissolved conductive salt, which composition overcomes the prior art problems of need for plasticizers and of need to crosslink the conductive composition. In this composition is found a thermoprocessable, non-crosslinked polymer blend containing a conductive salt which exhibits a combination of rigidity and flexibility which allows it to be used in small batteries and the like, with no need for solvents, with good resistance to water, and with the ability to conduct electricity at least equivalent to the myriad systems based on poly(ethylene oxide) which do not exhibit the other desirable physical properties of the present blends.

More particularly, I have discovered a conductive matrix composition, the matrix composition comprising a conductive matrix composition comprising a) from 10 to 90 percent of a first polymer, having a glass temperature below $-35°$ C. and a weight-average molecular weight of at least 20,000, of polymerized units of
   (i) from 0 to 90 percent of polymerized units of an alkyl or alkylthioalkyl ester of acrylic or methacrylic acid, and
   (ii) 10 to 100 percent of polymerized units of a poly(alkyleneoxy)(meth)acrylate comonomer of the formula

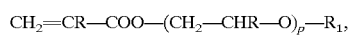

where R is H or $CH_3$, $R_1$ is $C_1$–$C_{20}$ alkyl, cycloalkyl, aryl, alkaryl, or aralkyl, and p is 1–1000;

b) from 10 to 90 percent of a second polymer, of weight-average molecular weight at least 30,000, of polymerized units of at least one alkyl ester of acrylic or methacrylic acid, c) from 0.5 to 20 percent of a conductive salt having alkaline earth or alkali metal cations;

wherein the first polymer and the second polymer of the matrix composition are miscible, and wherein the conductive salt is miscible with the matrix composition. One preferred aspect of the invention is when p is from 8 to 10. Another preferred aspect is when the second polymer is a copolymer of polymerized units of methyl methacrylate and of ethyl acrylate, and wherein component (i) of the first polymer is ethyl acrylate.

The following definitions are used herein: "compatible" means exhibiting physical properties consistent with at least an average of the properties of the two components, whilst "miscible" means no domains of size above 50 nanometers. in the blend can be detected, and with a single glass transition temperature ($T_g$) of the blend. Percentages are by weight.

The invention also comprises a lithium cell comprising a positive electrode, a negative electrode facing the positive electrolyte and a solid electrolyte interposed therein, wherein the solid electrolyte is the conductive matrix composition described above, formed from the blend of two polymers and a conductive salt.

The first polymer of the composite matrix composition may be a homopolymer of polymerized units of poly(alkyleneoxy)acrylate or methacrylate or a copolymer of polymerized units of an alkyl or alkylthioalkyl ester of acrylic or methacrylic acid with a poly(alkyleneoxy)acrylate or methacrylate. The poly(alkyleneoxy)(meth)acrylate comonomer is of the general formula:

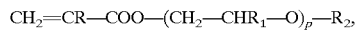

where R is H or $CH_3$, $R_1$ is H or $CH_3$, and $R_2$ is $C_1$–$C_{20}$ alkyl, cycloalkyl, aryl, alkaryl, or aralkyl, and p is 1–1000. It is preferred that $R_1$ be a $C_1$ or $C_2$ alkyl group when p is 3–1000. A preferred range is p=3–50. When p is less than 3, $R_1$ should preferably be $C_3$–$C_{20}$ alkyl, $C_6$–$C_{20}$ aryl or $C_7$–$C_{30}$ alkaryl group. The methyl esters, i.e. R=$CH_3$, are preferred because of their photochemical stability.

The alkyl or alkylthioalkyl ester of acrylic or methacrylic acid component of the first polymer may be such as methyl acrylate, ethyl acrylate, propyl acrylate, isopropyl acrylate, n-butyl acrylate, sec-butyl acrylate isobutyl acrylate, t-butyl acrylate, hexyl acrylate, heptyl acrylate, 2-heptyl acrylate, 2-ethylbutyl acrylate, dodecyl acrylate, n-hexyl methacrylate, n-octyl methacrylate, 2-ethylhexyl methacrylate, n-decyl methacrylate, lauryl methacrylate, tetradecyl methacrylate, octadecyl methacrylate, ethylthioethyl methacrylate, and the like.

The alkyl ester of acrylic or methacrylic acid component of the second polymer may be such as methyl acrylate, ethyl acrylate, propyl acrylate, isopropyl acrylate, n-butyl acrylate, sec-butyl acrylate, isobutyl acrylate, t-butyl acrylate, hexyl acrylate, heptyl acrylate 2-heptyl acrylate, 2-ethylbutyl acrylate, dodecyl acrylate, n-hexyl methacrylate, n-octyl methacrylate, 2-ethylhexyl methacrylate, n-decyl methacrylate, lauryl methacrylate, tetradecyl methacrylate, octadecyl methacrylate, hexadecyl acrylate, isobornyl acrylate, cyclohexyl acrylate, methyl methacrylate, ethyl methacrylate, n-propyl methacrylate, isopropyl methacrylate, n-butyl methacrylate, sec-butyl methacrylate, isobutyl methacrylate, t-butyl methacrylate, 2-ethylbutyl methacrylate, cyclohexyl methacrylate, isobornyl methacrylate, 3,3,5-trimethylcyclohexyl methacrylate, and the like.

Other co-monomers may be present in either or both of the polymeric components of the composition, as long as the mutual miscibility of the two polymers is maintained. The polymerizing mixture may contain mercaptan or some other chain transfer agent to control the molecular weight, and the second polymer formed may contain a multifunctional monomer at a low level to lower creep in the formed blend. It is preferred not to use a crosslinker to assure reprocessability of the matrix.

A preferred copolymer composition comprises of the following molecularly miscible copolymers:

a) From 5 to 95 weight percent of a first polymer containing 10 weight percent of polymerized units of monomethoxy poly(ethylene glycol (Mw=400) monomethacrylate) (MMPEG(400)MM) (found in the Experimental section as M#1) and 90 weight percent of polymerized units of ethyl acrylate;

b) From 95 to 5 weight percent of a second polymer comprising 40 weight percent of polymerized units of ethyl acrylate and 60 weight percent of polymerized units of methyl methacrylate.

The two stage (meth)acrylic copolymers described in this invention may be prepared by a process of in-situ bulk or emulsion polymerization utilizing commercially available monomers. For best conductivity performance for the resulting conductive matrix composition, the monomers should be of high purity, and impurities in the polymer which adversely affect conductivity or attack the electrodes should be removed. Other suitably adapted polymerization methods such as solution and suspension polymerization techniques may also serve to make the polymers. One preferred method is the use of a continuous feed stirred tank reactor (CFSTR), such as polymerizing the first polymer in bulk and then transferring that polymer, along with the monomers which form the second polymer, into a CFSTR. If a small amount of unreacted monomer is carried into the second polymerization, miscibility of the two polymers will in general be increased.

The weight average molecular weight of the first polymer may vary from 20,000 to 150,000, although higher molecular weights may be employed. A preferred molecular weight range is 30,000 to 100,000. The weight average molecular weight of the final stage copolymer may vary from 30,000 to 500,000, although higher molecular weights may be employed. A preferred molecular weight range of 100,000 to 200,000 is more than adequate to facilitate ease of processing of the polymer blends, whilst maintaining thermal and rheological stability of the blend compositions. In the course of thermal processing, small quantities of additives may be added to the polymer for the purpose of improving the physical properties of the final article of commerce, although for best conductivity results, it is preferred these be kept to a minimum. Examples of additives may include one or many of the following classes of compounds: antioxidants, ultraviolet light absorbers, plasticizers, antistatic agents, slip agents, coloring agents, fillers and other compounds. The second polymer may be cross-linked after fabrication and combination with the conductive salt is complete, such as by an initiator of cross-linking which generates radicals upon exposure to UV light.

The conductive salt of an alkaline earth or alkali metal may be present in the mixture of monomers prior to initiation of the polymerization of the monomers to form the first or second polymer, or may be admixed into the polymers by conventional blending methods (which may require a small amount of a volatile and removable solvent to assure mixing) prior to the formation of the solid electrolyte. The preferred salts are those of lithium, which may be any of those taught in the prior art as useful as conductive salts for PEO-related systems, such as $LiClO_4$, $LiPF_6$, $LiBF_4$, $Li(CF_3SO_2)$, $LiN(CF_3SO_2)$ and the like, more preferably being $LiN(CF_3SO_2)_2$. Other lithium salts with large and soluble counterions may also be employed. Some experimentation may be required to determine the optimum amount of lithium salt to be used.

The compositions claimed herein may be incorporated into a lithium cell comprising a positive electrode, a negative electrode facing the positive electrode, and the solid electrolyte which is the claimed composition acting as a means for transference of electrical charge. The battery will be useful as a power source of electronic and electrical components, and will be rechargeable. A variety of ancillary materials may also be present in the battery including conductive wiring, permeable or semi-permeable membranes to prevent migration of electrode species, additives to prevent deposits at electrode surfaces, and the like.

The following examples will illustrate the properties of the family of unique compositions. All compositions referred to in the examples are in weight percent unless otherwise specified.

The following abbreviations are used in Tables: MMA=methyl methacrylate; EA=ethyl acrylate; monomethyl ether-poly(ethylene glycol(400))-monomethacrylate=M#1; 2(2-ethoxy ethoxy)-ethyl acrylate=M#2; monomethyl ether-poly(ethylene glycol(350))-monomethacrylate=M#3; poly(propylene glycol (400))-monomethacrylate=M#4.

EXAMPLE A

Bulk Polymerization of the First and Second Polymers: Procedure

1. First Polymer: The first polymer may be prepared by a bulk polymerization technique as exemplified by the following: A monomer mixture was prepared, having ethyl acrylate (EA) : monomethoxy poly(ethylene glycol (400) monomethacrylate) (M#1) ratio of 9:1. The mixture contained 87.7% of ethyl acrylate (EA), 9.7% of monomethoxy poly(ethylene glycol (400) monomethacrylate), 0.07% of 1,1'-azobis-(cyclohexanecarbonitrile) and 2.44% of n-dodecyl mercaptan. This mixture was fed into a glass vessel in which the mixture was purged with an inert gas such as nitrogen. After purging, the monomer mixture was degassed and kept under a nitrogen blanket. The mixture was then pumped at a maximum rate of 15 g/min. through a series of filters into the continuous flow stirred tank reactor (CFSTR) in which the monomers were copolymerized to yield 86 weight percent monomer conversion. The polymerization was accomplished at temperatures ranging from 105 to 125° C. At this temperature range, the operating pressure and stirring rate was set at 120 psi and 300 RPM respectively. Since the polymerization reaction is exothermic, the reactor temperature was controlled with the aid of a cooling jacket. The polymerization was performed neat, i.e. in the absence of a solvent.

2. Second Polymer: The mixture comprising the first polymer and residual monomer was dissolved in a monomer mixture which comprises of the following ingredients: 49.9 weight percent of the first polymer, 29.9 weight percent of methyl methacrylate (MMA), 19.9 weight percent of EA, 0.03% of 1,1'-azobis(cyclohexanecarbonitrile) and 0.25% of n-dodecyl mercaptan. The mixture was similarly purged with nitrogen, degassed and kept under a nitrogen blanket. The degassed mixture was fed through a series of filters at a maximum rate of 15 g/min. into a CFSTR in which the final stage polymerization occurs to yield a molecularly miscible blend of the two polymers. The formation of the second polymer was similarly carried out at temperatures ranging from 120 to 125° C. The stirring rate and pressure were the same as that used in the preparation of the first polymer. Unpolymerized MMA, EA and monomethoxy poly (ethylene glycol (400) monomethacrylate) were removed from the two stage copolymer solution effluent in a stripping action with a static mixer equipped with a vacuum pump. The overhead fraction from the stripping column comprising of unpolymerized monomers may be passed to a recovery system or, preferably, recycled to the second stage of the polymerization process.

The residence time in the polymerization reaction vessel (CFSTR), the monomer feed rate, the initiator and chain transfer concentration and the polymerization temperature were arranged in order to ensure monomer conversion ranging from 80 to 90 weight percent.

EXAMPLE B
Emulsion Polymerization of the First and Second Polymers: Procedure

The polymeric components of the composition may also be prepared by emulsion polymerization. An example of the general procedure follows.

1. First Polymer: A monomer mixture was prepared, having a ethyl acrylate(EA): monomylether-poly (ethylene glycol(400)-monomethacrylate (M#1) ratio of 90:10. The mixture contained 54.9% of EA, 6.1% of M#1, 1.5% of n-dodecyl mercaptan, 36.7% of deionized (DI) water and 0.8% of a 10% aqueous sodium dodecylbenzene sulphonate solution. To an appropriate glass vessel equipped with stirrer, heater, a reflux condenser, and nitrogen sparge tube, was added 97.2% of DI water and 0.03% of sodium carbonate. The mixture was sparged for one hour with nitrogen while heating to 70° C. The sparge rate was then changed to a sweep and 2.7% of a 10% aqueous sodium dodecylbenzene sulphonate solution was added to the mixture. The temperature of the reaction vessel was then raised to 85° C. At this temperature 18.03 ml of the initiator mixture which consisted of 0.34% of sodium persulfate and 99.7% of deionized water was added to the reaction vessel. The monomer mixture was then fed into the reaction vessel at the rate of 7.56 ml/min. As the polymerization proceeded, the initiator mixture was added to the reaction vessel at the rate of 1.3 ml/min. The accumulation of solids was measured every 30 minutes. At the completion of the initiator and monomer addition, the mixture was held at 85° C. for one hour. The mixture was then cooled and stored in a polyethylene jar in preparation for the second and final stage of the polymerization.

2. Second polymer: A second polymer which is a copolymer of methyl methacrylate (MMA) and EA was formed in the presence of the first polymer by an in-situ emulsion polymerization technique as follows: A monomer mixture was prepared, having MMA: EA ratio of 60:40. The mixture contained 37.2% of MMA, 24.8% of EA, 0.3% of n-dodecyl mercaptan, 36.5% of DI water and 1.2% of a 10% aqueous sodium dodecylbenzene sulphonate solution. The monomer mixture was polymerized according to the following procedure. To an appropriate glass vessel equipped with stirrer, heater, a reflux condenser, and nitrogen sparge tube, was added: 67.9% of the emulsion of the first polymer, and 32.1% of DI water. The mixture was sparged for one hour with nitrogen while heating to 70° C. The sparge rate was then changed to a sweep. The temperature of the reaction vessel was then raised to 85° C. At this temperature 17.63 ml. of the initiator mixture which consisted of 0.22% of sodium persulfate and 99.78% of deionized water was added to the reaction vessel. The monomer mixture was then fed into the reaction vessel at the rate of 4.30 ml./min. As the polymerization proceeded, the initiator mixture was added to the reaction vessel at the rate of 1.17 ml/min. The accumulation of solids was measured every 30 minutes. At the completion of the initiator and monomer addition, the mixture was held at 85° C. for one hour. The mixture was then cooled, filtered, and polymer isolated by freeze-drying. The mixture of first and second polymers may also be isolated from emulsion by spray-drying or by coagulation, although a method which does not introduce further ionic impurities is preferred.

EXAMPLES 1–3

The bulk polymerization reaction technique which is outlined in Preparative Example A was employed in the preparation of the two stage molecularly miscible copolymer system of the following composition: The first polymer comprises EA and poly(ethylene glycol (400) monomethacrylate) (M#1) in the weight ratio of 19:1 respectively. The second polymer is a copolymer of MMA and EA, in the weight ratio of 3:2 respectively, and constitutes a total of 70% w/w of the two stage polymer content. The final polymer was optically clear, and exhibits significant adhesion to glass and metal substrates. Polymer electrolyte was prepared from a mixture of the two stage polymer and 7.53 weight percent of lithium perchlorate ($LiClO_4$) salt in a common solvent such as acetone. Thin film samples were cast from the solution, dried in a vacuum oven and tested for ionic conductivity. The physical properties of the copolymer and the derived polymer electrolyte are listed in Tables I and II.

EXAMPLE 4

Using the previously described bulk polymerization process of Example A, a molecularly miscible polymer blend is prepared as follows: The polymeric blend is synthesized by in situ polymerization of a low $T_g$ (ca. 42° C.) copolymer, P(MMA-EA=60/40), in the presence of a molecularly dispersed low $T_g$ (ca. −53° C.) copolymer, P(EA-M#1). The latter copolymer was prepared from an immiscible monomer mixture, which comprised ethyl acrylate and M#1 in the weight ratio of 9:1 respectively, to yield an optically clear copolymer. This copolymer was then dissolved and subsequently polymerized in a monomer mixture, that comprised the first polymer, MMA and EA monomers in the weight ratio of 38:37:25 respectively, yielding an optically clear, tough, non-blocking polymer that adheres readily to glass and metal substrates. A combination of optical microscopy and dynamic mechanical thermal analysis (DMTA) has shown that the above copolymer system exhibits all of the optical (clarity and dispersed phase <10 nm in particle size) and thermal (single $T_g$) characteristics of a molecularly miscible copolymer system. A physical blend of the two stage polymer with 7.53 weight percent of lithium perchlorate (LiClO4) in acetone yields a clear homogeneous solution. Thin film samples, prepared from the solution, exhibited high ionic conductivity. The thermal, electrical and molecular properties are listed in Tables I and II.

EXAMPLES 5–7

In these examples a first polymer of polymeric units of EA and M#1 was combined with a second polymer of polymeric units of MMA and EA monomers. In Example 5, the composition of the mixture employed to prepare the second polymer was as follows: 40 weight percent of P(EA-M#1)= 90/10, 36 weight percent of MMA, and 24 weight percent of EA. A chain transfer agent (alkyl mercaptan) was added to the monomer mixture to yield a weight average molecular weight of 42.6 k. The entire mixture was polymerized, as previously described, to yield a blend of the two polymers. Homogeneous solutions were prepared from varying amounts of the polymer composite and lithium salt, LiClO$_4$, in acetone. Film samples were prepared from the solutions by casting and drying in a vacuum oven. The thermal, molecular and electrical properties of the polymer and polymer electrolytes are listed in Tables I and III.

EXAMPLES 8–11

In these further examples, the first and second polymers were formed as in the earlier Examples. In Example 10, the first polymer was a copolymer of EA and poly(propylene glycol (400))-mono methacrylate (M#4). The thermal, molecular and electronic properties of the polymer and polymer electrolytes are listed in Tables I–V.

TABLE I

| Example # | Second Polymer/First Polymer | Composition, %/% | MW | $T_g$, °C. |
|---|---|---|---|---|
| 1-first polymer | EA-M#1 = 95/5 | 100 | 30,400 | −55 |
| 1 | MMA-EA = 60/40/Ex. 1-P | 70/30 | | |
| 2 | MMA-EA = 60/40/Ex. 1-P | 50/50 | 30,900 | −58 |
| 3 | MMA-EA = 60/40/Ex. 1-P | 60/40 | | |
| 4-first polymer#1 | EA-M#1 = 95/5 | 100 | 29,200 | −54 |
| 4-first polymer#2 | EA-M#1 = 90/10 | 100 | 30,000 | −62 |
| 4 | MMA-EA = 60/40/Ex. 4-P#2 | 62/38 | 36,300 | −46 |
| 5-first polymer | EA-M#1 = 90/10 | 100 | 25,200 | −62 |
| 5 | MMA-EA = 60/40/Ex. 5-P | 60/40 | 42,600 | −51 |
| 6 | MMA-EA = 60/40/Ex. 5-P | 60/40 | 52,400 | −49 |
| 7 | MMA-EA = 60/40/Ex. 5-P | 60/40 | 60,800 | −33 |
| 8-first polymer | EA-M#1 = 90/10 | 100 | 25,200 | −54 |
| 9 | MMA-EA = 60/40/Ex. 8-P | 70/30 | 68,900 | −24 |
| 10-first polymer | EA-M#4 = 90/10 | 100 | | −39 |
| 10 | MMA-EA = 60/40/Ex. 10-P | 60/40 | 32,300 | −39 |
| 11 | MMA-EA = 60/40/Ex. 10-P | 50/50 | 32,500 | −32 |

TABLE II

| Example # | Polymer | Composition, %/% | Conductivity ($\Omega^{-1}$ cm$^{-1}$), 23° C., undoped | Cond. 23° C., doped | Cond., 33° C., doped |
|---|---|---|---|---|---|
| 1 | MMA-EA= 60/40//Ex. 1-P | 70/30 | $1.2 \times 10^{-9}$ | $6.2 \times 10^{-5}$ | — |
| 2 | MMA-EA= 60/40//Ex. 1-P | 60/40 | $2.8 \times 10^{-12}$ | $5.7 \times 10^{-5}$ | $1.7 \times 10^{-5}$ |
| 3 | MMA-EA= 60/40//Ex. 1-P | 50/50 | $6.8 \times 10^{-10}$ | $1.2 \times 10^{-5}$ | $4.7 \times 10^{-5}$ |
| 5 | MMA-EA = 60/40//Ex. 5-P | 62/38 | — | $3.5 \times 10^{-5}$ | $15 \times 10^{-5}$ |

TABLE III

| Polymer#, % in composite | LiClO4, % in composite | MW × 10$^{-3}$ | Conductivity ($\Omega^{-1}$ cm$^{-1}$), 23° C. |
|---|---|---|---|
| 6, 92.1 | 7.9 | 42.6 | $1.6 \times 10^{-5}$ |
| 7, 92.1 | 7.9 | 52.4 | $2.0 \times 10^{-5}$ |
| 8, 92.1 | 7.9 | 60.8 | $1.2 \times 10^{-5}$ |
| 6, 90 | 10 | 42.6 | $0.2 \times 10^{-5}$ |
| 7, 90 | 10 | 52.4 | $7.2 \times 10^{-5}$ |
| 8, 90 | 10 | 60.8 | $0.8 \times 10^{-5}$ |
| 6, 85 | 15 | 42.6 | $6.0 \times 10^{-5}$ |
| 7, 85 | 15 | 52.4 | $3.6 \times 10^{-5}$ |
| 8, 85 | 15 | 60.8 | $0.8 \times 10^{-5}$ |

TABLE IV

| Polymer #, % in composite | LiClO4, % in composite | MW × 10⁻³ | Conductivity ($\Omega^{-1}$ cm$^{-1}$), 23° C. | Conductivity ($\Omega^{-1}$ cm$^{-1}$), 33° C. |
|---|---|---|---|---|
| 9, 92.1 | 7.9 | 68.9 | $0.2 \times 10^{-5}$ | $0.8 \times 10^{-5}$ |
| 10, 92.1 | 7.9 | 32.3 | $1.6 \times 10^{-5}$ | $3.1 \times 10^{-5}$ |
| 9, 90 | 10 | 68.9 | $6.5 \times 10^{-5}$ | $11.0 \times 10^{-5}$ |
| 10, 90 | 10 | 32.3 | $0.2 \times 10^{-5}$ | $0.9 \times 10^{-5}$ |
| 9, 85 | 15 | 68.9 | $5.4 \times 10^{-5}$ | $11.3 \times 10^{-5}$ |
| 10, 85 | 15 | 32.3 | $0.2 \times 10^{-5}$ | $0.4 \times 10^{-5}$ |

TABLE V

| Polymer #, % in composite | LiClO4, % in composite | $T_g$, ° C. | Conductivity ($\Omega^{-1}$ cm$^{-1}$), 23° C., | Conductivity ($\Omega^{-1}$ cm$^{-1}$), 33° C., |
|---|---|---|---|---|
| 11, 92.1 | 7.9 | −35 | $3.3 \times 10^{-5}$ | $4.3 \times 10^{-5}$ |
| 11, 90 | 10 | −30 | $0.9 \times 10^{-5}$ | $2.3 \times 10^{-5}$ |
| 11, 85 | 15 | −37 | $4.3 \times 10^{-5}$ | $5.1 \times 10^{-5}$ |

Because knowledge of the conductivity, measured by a.c. technique, is insufficient for determining the performance of solid state electrolytes used in batteries, two all solid state electrochemical cells were fabricated and evaluated. The cells, for the purpose of identification, are labeled Cell(A) and Cell(B), Table VI. Each cell comprises a 40.32 cm²×34 mils of lithium foil anode. The polymer electrolyte membrane, which acts both as a lithium ion conductor and a separator for the lithium anode and the cathode material was comparable in surface area to the lithium anode and 20 mils in thickness. The polymer electrolyte of Cell(A) was prepared from a mixture of the following two polymers, P(EA-M#1)=90/10)//P(MMA-EA=60/40)=70/30, with 10 wt. % of dry LiClO$_4$ salt. This yields an ethylene oxide (EO) to lithium ion (Li$^+$) molar ratio of 1.2 to 1 respectively. The cathode layer was prepared from a mixture of 50 wt. % TiS$_2$ (intercalation compound), 40 wt. % of solid polymer electrolyte and 10 wt. % of carbon acetylene black to form a plastic composite (2 mils), which was backed by a 5 mil thick nickel foil current collector. The lithium anode was similarly backed by a 5 mil thick nickel foil current collector. The entire arrangement was hermetically sealed between two layers of 0.75" thick poly(methyl methacrylate) sheets.

Cell(B) was similarly fabricated as Cell(A), but differs from Cell(A) in the composition of the electrolyte layer. The polymer electrolyte layer of Cell(B) was formulated from a mixture of 2 wt. % of dry LiClO$_4$ salt and 98 wt. % of the following two stage acrylic copolymer: P(EA-M#1)=90/10)//P(MMA-EA=60/40)=1:1. This corresponds to a molar ratio of EO to Li$^+$ of 4:1 respectively.

The active cathode material of both Cell(A) and Cell(B) was the intercalation compound titanium disulfide (TiS$_2$). This material possesses an open structure which is capable of reversible insertion-deinsertion of lithium ions from the electrolyte layer. In the electrochemical discharge process, lithium ions migrate from the anode, through the electrolyte layer and become anchored between two sheets of hexagonally close-packed sulfur atoms. The reverse electrochemical process occurs during cell recharge. The electrochemical reaction of the Li/TiS$_2$ couple:

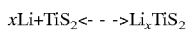

$$x\text{Li} + \text{TiS}_2 \leftarrow - - \rightarrow \text{Li}_x\text{TiS}_2$$

yields a 2.6 V open circuit voltage (OCV) for 0<x<1. The OCV falls off as the concentration, x, of Li$^+$ ions in TiS$_2$ approaches unity. The cell is then in a fully discharged condition. With the aid of a multi-meter, the OCV's of both Cell(A) and Cell(B) were determined to be: 2.45 and 3.004 V respectively, shortly after fabrication. The current density of Cell(B) was also measured and, as seen in Table VI, was comparable to that reported for Li/TiS$_2$ cells.

TABLE VI

| Battery | OCV (V) | Current Density, mA/cm$^{-2}$ |
|---|---|---|
| Typical Li/TiS$_2$ Cell | 2.60 | 0.20 |
| Cell (A) | 2.45 | — |
| Cell (B) | 3.00 | 0.25 |

COMPARATIVE EXAMPLE 12

For the purpose of comparison, a sample of the 'classical' poly(ethylene oxide)(PEO)-LiCF$_3$SO$_3$ electrolyte was prepared and tested under similar conditions as those used to evaluate the acrylic electrolytes. The PEO-LiCF$_3$SO$_3$ electrolyte was prepared from a mixture of a high molecular weight PEO (Mw=10$^6$) and LiCF$_3$SO$_3$ salt in the molar ratio of 8:1 in moles of EO to Li$^+$ respectively. A film sample was cast from the mixture in acetonitrile. The film was dried at 50° C. for 48 hours and for a further 24 hours under full vacuum. The film was then tested for ionic conductivity by the complex impedance method. From the data listed in Table VII, it can be seen that the ionic conductivity of the (PEO)$_8$LiCF$_3$SO$_3$ polymer electrolyte was at least three orders of magnitude lower than that of one of the typical lithium salt/polymer blend electrolytes of the present invention. It should also be mentioned that the ionic conductivity values determined for the (PEO)$_8$LiCF$_3$SO$_3$ fall within the limits of similarly measured values in the prior art for this system of polymer electrolyte. As can be seen in Table VII, the electrolyte membrane based on the combination of poly(ethylene oxide) and lithium salt (LiCF$_3$SO$_3$) approaches useful conductivity values only above, 73° C., its crystalline to amorphous transition region. Hence, lithium polymer batteries using this membrane must operate at temperatures higher than ambient, typically around 100° C.

TABLE VII

| Conductivity, $\Omega^{-1}$ cm$^{-1}$ (Example 12) | Temperature, ° C. | Thickness, mils | Conductivity, $\Omega^{-1}$ cm$^{-1}$ |
|---|---|---|---|
| PEO/LiCF$_3$SO$_3$ = 69/31 | 25 | 24.9 | $6.0 \times 10^{-9}$ |
| PEO/LiCF$_3$SO$_3$ = 69/31 | 73 | 22.6 | $3.3 \times 10^{-6}$ |
| Reference | 25 | | $1.5 \times 10^{-7}$ |
| Reference | 73 | | $3.0 \times 10^{-5}$ |

I claim:

1. A conductive matrix composition comprising
   a. from 10 to 90 percent of a first polymer, having a glass temperature below 35° C. and a weight-average molecular weight of at least 20,000, of polymerized units of
      (i) from 0 to 90 percent of polymerized units of an alkyl or alkylthioalkyl ester of acrylic or methacrylic acid, and
      (ii) 10 to 100 percent of polymerized units of a poly(alkyleneoxy)(meth)acrylate comonomer of the formula

where R is H or $CH_3$, $R_1$ is H or $CH_3$, and $R_2$ is $C_1$–$C_{20}$ alkyl, cycloalkyl, aryl, alkaryl, or aralkyl, and p is 1–1000;
   b. from 10 to 90 percent of a second polymer, of weight-average molecular weight at least 30,000, of polymerized units of at least one alkyl ester of acrylic or methacrylic acid,
   c. from 0.5 to 20 percent of a conductive salt having alkaline earth or alkali metal cations;

wherein the first polymer and the second polymer of the matrix composition are miscible, and wherein the conductive salt is miscible with the matrix composition.

2. The composition of claim 1 wherein p is from 8 to 10.

3. The composition of claim 1 wherein the second polymer is a copolymer of polymerized units of methyl methacrylate and of ethyl acrylate, and wherein component (i) of the first polymer is ethyl acrylate.

4. The composition of claim 1 wherein the conductive salt is selected from the group consisting of $LiClO_4$, $LiPF_6$, $Li(CF_3SO_3)$ and $LiN(CF_3SO_2)_2$.

5. The composition of claim 4 wherein the lithium salt is $LiN(CF_3SO_2)_2$.

6. A lithium cell comprising a positive electrode, a negative electrode facing the positive electrolyte and a solid electrolyte interposed therein, wherein the solid electrolyte is the composition of claim 1.

* * * * *